US007171222B2

(12) United States Patent
Fostick

(10) Patent No.: US 7,171,222 B2
(45) Date of Patent: Jan. 30, 2007

(54) MULTIMEDIA MESSAGING METHOD AND SYSTEM FOR TRANSFERRING MULTIMEDIA CONTENT

(75) Inventor: Gideon Fostick, Givat Shmuel (IL)

(73) Assignee: Comverse, Ltd., Tel Aviv (IL)

( * ) Notice: Subject to any disclaimer, the term of this patent is extended or adjusted under 35 U.S.C. 154(b) by 449 days.

(21) Appl. No.: 10/259,297

(22) Filed: Sep. 30, 2002

(65) Prior Publication Data

US 2004/0063449 A1 Apr. 1, 2004

(51) Int. Cl.
*H04Q 7/20* (2006.01)
(52) U.S. Cl. ........... 455/466; 455/414.1; 455/412.1; 455/517; 709/206; 709/231
(58) Field of Classification Search .. 455/414.1–414.3, 455/412.1, 466, 517; 709/231, 206
See application file for complete search history.

(56) References Cited

U.S. PATENT DOCUMENTS

| | | | | |
|---|---|---|---|---|
| 6,757,851 | B1 * | 6/2004 | Park et al. | 714/48 |
| 6,813,638 | B1 * | 11/2004 | Sevanto et al. | 709/227 |
| 6,870,547 | B1 * | 3/2005 | Crosby et al. | 345/619 |
| 2002/0013154 | A1 * | 1/2002 | Soh et al. | 455/466 |
| 2002/0044634 | A1 * | 4/2002 | Rooke et al. | 379/93.01 |
| 2002/0143977 | A1 * | 10/2002 | Togashi | 709/231 |
| 2003/0028660 | A1 * | 2/2003 | Igawa et al. | 709/231 |
| 2003/0145038 | A1 * | 7/2003 | Bin Tariq et al. | 709/202 |
| 2004/0120311 | A1 * | 6/2004 | Marsot et al. | 370/352 |
| 2004/0153513 | A1 * | 8/2004 | Laumen et al. | 709/206 |

FOREIGN PATENT DOCUMENTS

| | | | |
|---|---|---|---|
| DE | 10126847 A1 * | 6/2001 | |
| FR | 2844948 A * | 3/2004 | |
| WO | WO02059761 * | 8/2002 | |
| WO | WO2004028108 * | 4/2004 | |

OTHER PUBLICATIONS

"Multimedia messaging service for FPRS and UMTS", J.Sevanto; IEE on WCNC, Sep. 1999, pp. 1422-1426, vol. 3.*
"Multimedia messaging service for GPRS and UMTS", J.Sevanto; IEEE on WCNC, Sep. 1999, pp. 1422-1426, vol. 3.*

* cited by examiner

*Primary Examiner*—Matthew Anderson
*Assistant Examiner*—Sujatha Sharma
(74) *Attorney, Agent, or Firm*—Sughrue Mion, PLLC

(57) ABSTRACT

A method and system for sending messages including multimedia content between mobile communication devices via relays. Synchronized local caches are maintained at the relays for storing and retrieving multimedia content originating with end-users, without the necessity of storing the multimedia content into the caches upon publication by a service provider. When a first mobile communication device wishes to send multimedia content to a second mobile communication device, the first mobile communication device initially transmits a digest of the multimedia content to a first relay, rather than the entire multimedia content, and the first relay searches a first local cache maintained by the first relay using the digest to determine whether the multimedia content is stored in the local cache. When the multimedia content is stored in the first local cache, the first relay sends to the second relay a reference to the multimedia content. By utilizing synchronized local caches and transmitting digests and references for multimedia content, redundant transfers of the entire multimedia content are eliminated.

58 Claims, 3 Drawing Sheets

MULTIMEDIA MESSAGING METHOD AND SYSTEM FOR TRANSFERRING MULTIMEDIA CONTENT

BACKGROUND OF THE INVENTION

1. Field of the Invention

The present invention relates to a method and system for sending messages including multimedia content, and more particularly, to a method and system for sending messages including multimedia content via mobile devices using Multimedia Messaging Service.

2. Description of the Related Art

Short Message Service (SMS) is part of the GSM specification wherein short text messages may be sent or received via mobile phones or devices. Multimedia Messaging Service (MMS) is a more recent enhanced as well as multimedia extension of SMS wherein messages including multimedia content may be sent or received via mobile phones or devices.

SMS messages are limited to 160 alpha-numeric characters and contain no images or graphics. SMS is a store-and-forward service, wherein messages are not sent directly between users but rather via an SMS Center. That is, once a message is sent by an originating mobile device or PC, the message is received by a SMS Center, which must then deliver it to the recipient's mobile device. To do this, the SMS Center sends a SMS Request to the home location register (HLR) to find a status of the recipient's mobile device. Once the HLR receives the request, the HLR responds to the SMS Center with the status of the recipient's mobile device, including whether the recipient's mobile device is inactive or active, and whether and where the recipient's mobile device is roaming. If the response is "inactive", then the SMS Center stores the message for a period of time. When the recipient's mobile device is accessed, the HLR sends a SMS Notification to the SMS Center, and the SMS Center attempts delivery. The SMS Center transfers the message in a Short Message Delivery Point to Point format to a serving system. The system pages the recipient's mobile device, and if it responds, the message gets delivered. The SMS Center receives verification that the message was received by the recipient's mobile device, then categorizes the message as being sent and does not attempt to send the message again.

MMS is the next generation of message service that may ultimately replace SMS. As its name suggests, MMS provides for the sending and receiving of messages comprising a combination of rich multimedia content including text, images, audio and video to MMS capable mobile phones or devices. Similar to SMS, MMS is a delivery service that uses store-and-forward technology rather than requiring an intermediate Internet-style mailbox. However, unlike SMS, virtually no limit is placed on the size or the sophistication of MMS message content. Further, MMS messages can be exchanged between MMS-enabled mobile devices and Internet e-mail accounts.

MMS utilizes a relay platform, hereafter referred to as an "MMS relay", which may include a relay for routing multimedia messages, an MMS server for handling and storing messages waiting to be delivered to destination devices in a message store, wherein the relay and the MMS server can be separate or integrated.

To send a multimedia message, a sender mobile device transmits the multimedia message to an MMS Relay. If the recipient's mobile device is served by a different MMS Relay, the sender's MMS Relay forwards the multimedia message to the recipient's MMS Relay. The recipient's MMS Relay sends the recipient's mobile device a notification that a new message is waiting. The recipient's mobile device can then download the message immediately or at a later time. The system may also be configured so that the multimedia message is automatically downloaded to the recipient's mobile device. Once the multimedia message is successfully downloaded, the sender's mobile device may be provided with a message indicating that the multimedia message was delivered.

As the use of MMS grows, wireless networks will need to handle ever-growing data traffic, since multimedia content elements, such as images, audio and video, are commonly much larger than current elements of data traffic such as SMS and mobile e-mail. Accordingly, there is a need to limit the impact and overload on wireless networks by improving the efficiency of such multimedia content transfers.

Inefficiencies are introduced by the architecture and message flow in MMS. As previously discussed, a multimedia message (e.g., an image) is sent from a sender's mobile device to a sender's MMS Relay, through the sender's MMS Relay to the recipient's MMS Relay, and then to the recipient's mobile device. Accordingly, this process consumes considerable bandwidth with the same multimedia content shuttling back and forth. In particular, the multimedia content may be forwarded by the recipient on to a third party; in such a case, the same multimedia content traverses the network additional times, adding further to the inefficient use of bandwidth.

Existing caching systems, such as Akamai content delivery service, operate to significantly reduce the number of legs of the traffic by providing Internet caching services for content that is sent by a Web server. In Akamai's service, caching mechanisms retain copies of content (e.g., Web pages or components of Web pages) in various physical locations, and transmit requested content to recipients from the nearest physical/geographical location in order to eliminate multiple transfers of content between distant locations. Upon publication of the content by a service provider, the content is loaded into the various caches and tagged with a reference (e.g., a URI). In all subsequent message transfer transactions, the reference to the content is transferred, rather than the content itself, until the end-user requests to view the content. When the end-user requests to view the content, the reference is used to retrieve the content from the cache which nearest to the end-user.

Three entities are involved in Akamai's service process: (a) the Web server, (b) the cache, and (c) the end-user's browser. Assuming that the Web server and the end-user's browser are located far away from each other and the cache is located close to the browser, the following stages are involved in the transfer of the content. First, the browser requests content from the Web server. Second, the server responds with an HTML page that contains a reference to the content. At this stage, the server does not send the content itself since this would require expensive bandwidth over the long distance between them. Third, the browser sends the reference to the cache and the cache sends the content to the browser to be viewed by the end-user. Since this takes place over a short physical distance, the bandwidth is relatively inexpensive.

However, existing caching solutions are based on the users receiving references to cached content. Therefore, caching the content and conversion to reference must be done beforehand, i.e., upon publication of the content. Moreover, content which was not previously cached and converted to reference upon publication is transferred as is, with no elimination of duplicate transfers.

U.S. Patent Application Publication No. US2002/0013154 (Soh et al.) discloses a method for generating multimedia events, such as images and/or sound in a mobile station, using a Short Message Service. An originating mobile station transmits an index corresponding to a selected multimedia event and an identification number of a receiving mobile station to a short message service center. The short message service center checks whether the receiving mobile station already contains data corresponding to the selected multimedia event using a database accessed by the short message service center. If the receiving mobile station already contains the data, the short message service center transmits only the index corresponding to the selected multimedia event to the receiving mobile station.

U.S. Patent Application Publication No. US2001/0026376 (I'Anson) discloses a system for transferring an image over a mobile radio network. A mobile entity incorporating digital camera functionality generates both a high resolution picture image and a low resolution thumbnail. The thumbnail is distributed via a mobile radio infrastructure to a service system which then transfers the thumbnail to specified recipients. After viewing the thumbnail, each recipient indicates to the service system whether the recipient wishes to receive the high resolution image. The high resolution picture image is then transferred from the mobile entity to those recipients wanting to receive the high resolution image.

SUMMARY OF THE INVENTION

In view of the drawbacks and disadvantages associated with the prior art multimedia content transfer methods and systems, the present invention provides synchronized local caches for storing and retrieving multimedia content originating with end-users, without the necessity of storing the multimedia content in the caches upon publication by a service provider. Further, the present invention transfers digests and references for multimedia content in order to search and retrieve multimedia content at the local caches, thereby eliminating redundant transfers of the entire multimedia content.

In accordance with a first embodiment of the present invention, when a first mobile communication device wishes to send multimedia content to a second mobile communication device, the first mobile communication device transmits a digest of the multimedia content to a first MMS relay rather than the entire multimedia content. The first relay searches a first local cache maintained by the first relay using the digest in order to determine whether the multimedia content is stored in the local cache. If the multimedia content corresponding to the digest is not stored in the cache, the first relay requests and receives the full multimedia content from the first mobile communication device and stores the multimedia content in the local cache for future retrieval. If the multimedia content corresponding to the digest has been previously stored in the local cache, the transfer between the first mobile communication device and the first relay is complete.

In accordance with a second embodiment of the present invention (which may be used with the first embodiment), when the first relay is to send multimedia content to a second relay, the first relay searches the first local cache to determine whether the multimedia content is in the first local cache. If the multimedia content is stored in the first local cache, the first relay sends to the second relay a reference to the multimedia content. The first local cache of the first relay and a second local cache of the second relay are synchronized so that the second relay can retrieve the multimedia content in the second local cache based on the reference to complete the transfer. If the multimedia content is not stored in the first local cache, the first relay sends the original multimedia content to the second relay and the multimedia content is stored in the first and second local caches with identical references.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that would have been known to one skilled in the art are omitted for the sake of brevity.

Figure 1:
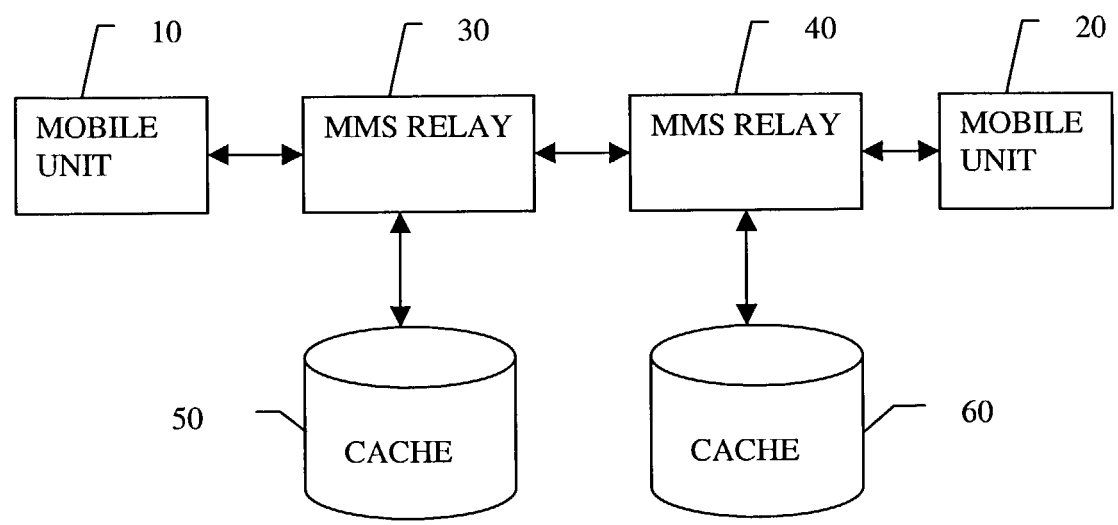
FIG. 1 is block diagram illustrating a representative Multimedia Messaging Service system in which the present invention implemented.

As shown in FIG. 1, an MMS system in accordance with the present invention includes a first MMS relay 30 communicably linked to a first local cache 50, and a second MMS relay 40 communicably linked to a second local cache 60. At least a first mobile device 10 is communicably linked to the first MMS relay 30, and at least a second mobile device 20 communicably linked to the second MMS relay 40. The link between the first mobile device 10 and the first MMS relay 30 and the link between the second mobile device 20 and the second MMS relay 40 include wireless transmission paths and, thus, are typically limited in terms of bandwidth. Although FIG. 1 only shows two MMS relays, the present invention may be utilized with an MMS system including any number of MMS relays, each communicably linked to at least one of the other MMS relays and to a local cache.

The first and second local caches 50 and 60 store multimedia content which is transferred via the first and second MMS relays 30 and 40. In particular, after receiving multimedia content from a mobile device, e.g., the mobile devices 10 and 20, which has not been previously stored in the first and second local caches 50 and 60, the first and second MMS relays 30 and 40 store the multimedia content in the first and second local caches 50 and 60 for later retrieval in order to reduce the amount of data transferred during subsequent multimedia message transfers.

The first and second local caches 50 and 60 are synchronized to store the same multimedia content such that when multimedia content is stored in one of the local caches, the same multimedia content is stored in the other local cache(s) at the other relay(s). The synchronized storage of multimedia content in the first and second local caches 50 and 60 may be performed at the time the multimedia content is received by the first MMS relay 30 or the second MMS relay 40. Alternatively, the first and second caches 50 and 60 may be periodically synchronized such that multimedia content which was newly stored in one of the first and second local caches 50 and 60 during a previous predetermined time period is stored in the other one of the first and second local caches 50 and 60, as well as other local caches (not shown) at other MMS relays (not shown), at set time intervals.

Although the example of the present invention depicted in FIG. 1 includes two MMS relays, each communicably linked to a local cache, large numbers of communicably linked MMS relays are typically utilized for implementing MMS. Therefore, periodic synchronization of the multimedia content stored in the local caches of the present invention may be preferable. Specifically, each MMS relay may store, in an associated local cache, new multimedia content upon receipt of the content, and at predetermined times, some or all MMS relays in the MMS system may send the new multimedia content to each other for storage the respective local caches. The MMS relays may send their new multimedia content to the other MMS relays at the same time, or different MMS relays may send their new multimedia content at different times.

The multimedia content is stored together with an identical reference in each of the first and second local caches 50 and 60 so that when subsequent transfers involve previously stored multimedia content, the reference, rather than the actual multimedia content, may be transmitted between the first and second MMS relays 30 and 40. The reference may be a unique identifier for the multimedia content which is established by a global naming convention so that no two multimedia contents have the same reference. Thus, the reference may be a file identifier, such as a pointer, file name or Uniform Resource Identifier (URI).

Further, the first and second MMS relays 30 and 40 may include a dedicated server (not shown) for searching the local caches 50 and 60, or the local caches 50 and 60 may include an internal searching functionality, such that the local cache 50 and 60 search for the multimedia content and provide a search result response to the first and second MMS relays 30 and 40.

In a conventional transfer of multimedia content from the first mobile device 10 to the second mobile device 20, the first mobile device 10 sends an MMS message including the entire multimedia content to the first MMS relay 30. In accordance with a first embodiment of the present invention, the transfer of multimedia content between a sender's mobile device and the sender's MMS relay is economized by initially transmitting a digest, described below, of a multimedia content, rather than the entire multimedia content, from the first mobile device 10 to the first MMS relay 30 when the first mobile device 10 wants to send the multimedia content to the second mobile device 20.

The digest of the multimedia content may be a small file that serves to identify the multimedia content so that the first MMS relay 30 can determine whether the multimedia content has been previously stored in the first local cache 50 associated with the first MMS relay 30. For example, in the case of picture or image, a digest may include a low-resolution JPEG image of the picture (which is small in size) and/or a cyclic redundancy check (CRC) identification stamp of the digital content. Together these identifiers uniquely identify the picture to a very high degree of certainty. However, the digest is not limited to the low resolution JPEG image and/or the CRC identification stamp but rather may be any identifier which serves to identify the corresponding multimedia content with a high degree of certainty.

Figure 2:
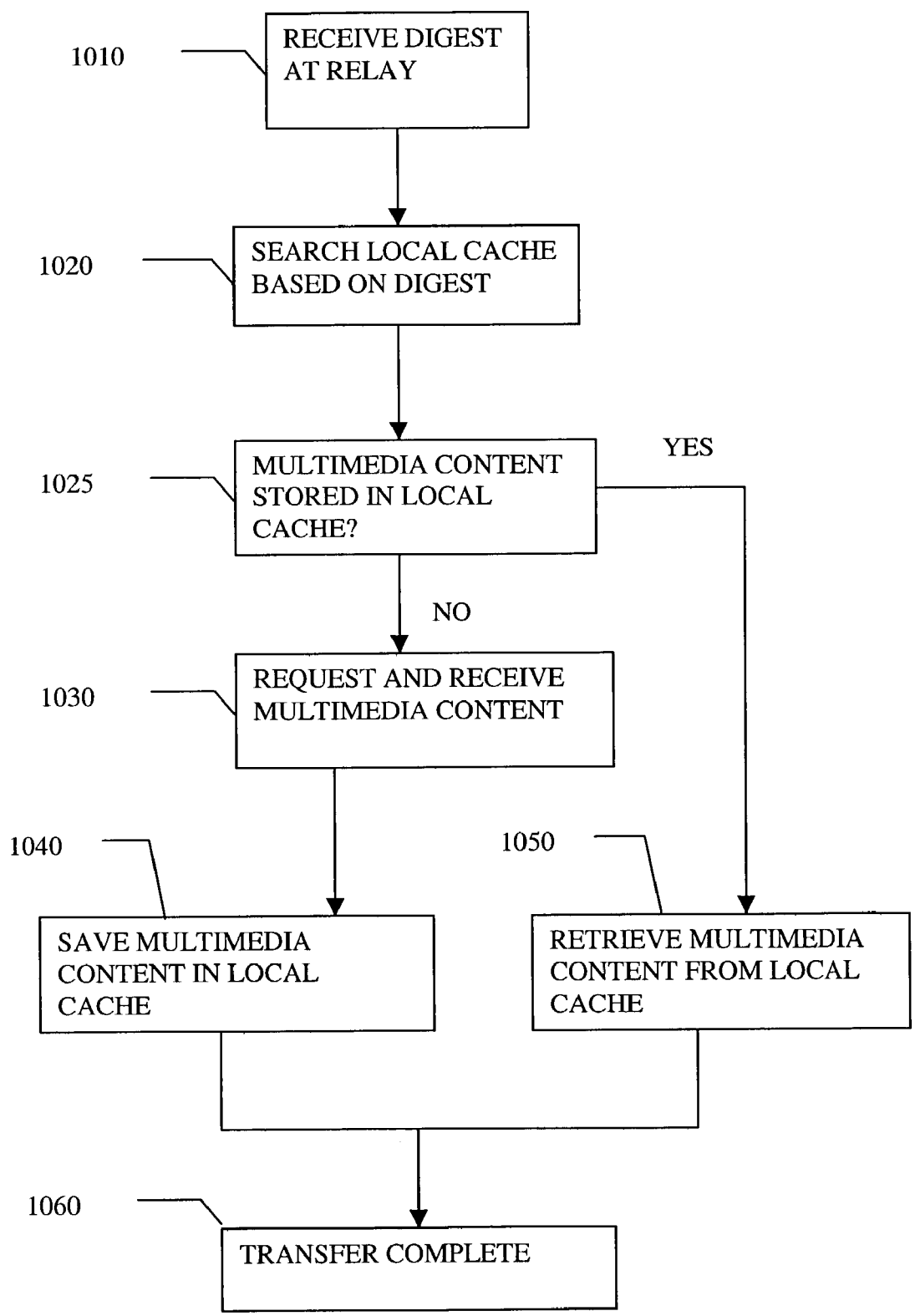
FIG. 2 is flow chart illustrating a method for transferring multimedia content in accordance with a first embodiment of the present invention.

According to the first embodiment of the present invention as illustrated in FIG. 2, the first MMS relay 30 receives from the first mobile device 10 the digest of the multimedia content indicating that the first mobile device 10 wants to send the multimedia content identified by the digest to the second mobile device 20 (1010). The first MMS relay 30 then searches the first local cache 50 using the digest received from the first mobile device 10 in order to determine whether the multimedia content to be transferred from the mobile device 10 is already stored in the local cache 50 (1020 and 1025).

If the first MMS relay 30 determines the multimedia content is not stored in the local cache 50, the first MMS relay 30 transmits a request to the first mobile device 10 for the entire multimedia content which is to be sent to the second mobile device 20 (1030). Upon receiving the request from the first MMS relay 30, the first mobile device 10 transmits the entire multimedia content to the first MMS relay 30 which stores the multimedia content in the first local cache 50 for future retrieval (1040) thereby completing the transfer of data between the first mobile device 10 and the first MMS relay 30 (1060). If the first MMS relay determines the multimedia content is stored in the local cache 50, the first MMS relay can retrieve the multimedia content from the first local cache 50 (1050), thereby completing the transfer of data between the first mobile device 10 and the first MMS relay 30 (1060).

By maintaining a local cache of previously transmitted multimedia content at the MMS relay and initially transmitting to the MMS relay a digest of the multimedia content which is utilized to search the local cache, in accordance with the first embodiment of the present invention, redundant transfers of the entire multimedia content are eliminated, thereby improving the efficiency of such multimedia content transfers.

In a conventional transfer of multimedia content from the first mobile device 10 to the second mobile device 20, the first MMS relay 30 transfers to the second MMS relay 40 an MMS message including the entire multimedia content received from the first mobile device 10 for delivery to the second mobile device 20. In accordance with a second embodiment of the present invention, the transfer of multimedia content between a sender's MMS relay and the receiver's MMS relay is economized by transmitting the reference to the multimedia content, rather than the actual multimedia content.

The second embodiment of the present invention will be described first in the case where the second embodiment of the present invention is utilized exclusive of the first embodiment of the present invention. That is, it is assumed that the first MMS relay 30 has initially received the multimedia content, as opposed to a digest of the multimedia content, from the first mobile device 10. However, as explained in detail later, the second embodiment of the present invention may be utilized together with the first embodiment of the present invention such that first MMS relay 30 initially receives the digest of the multimedia content from the first mobile device 10.

Figure 3:
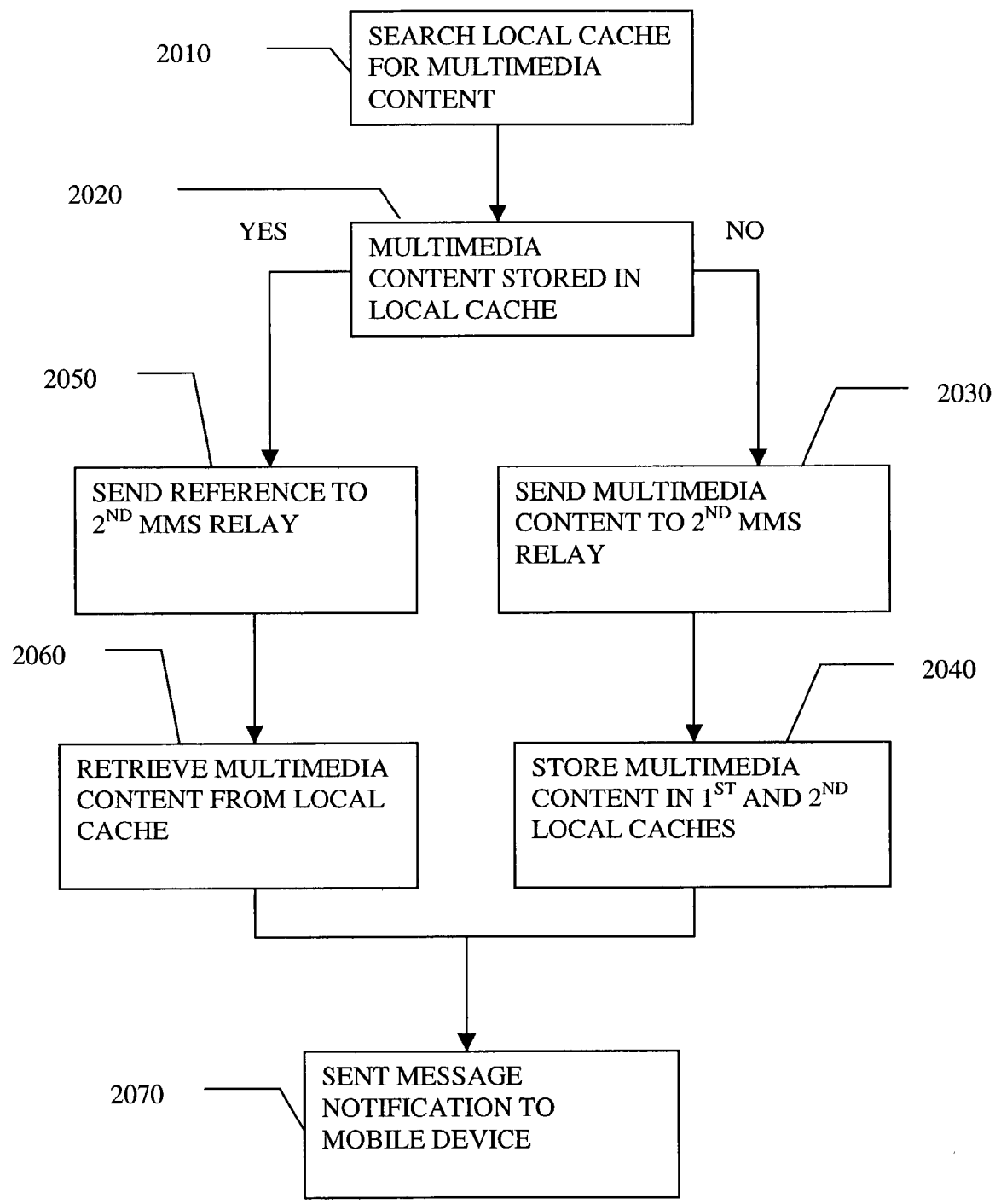
FIG. 3 is a flow chart illustrating a method for transferring multimedia content in accordance with a second embodiment of the present invention.

According to the second embodiment of the present invention as illustrated in FIG. 3, when the first MMS relay 30 receives multimedia content to be transferred from the first mobile device 10 to the second MMS relay 40, the first MMS relay 30 searches the first local cache 50 to determine whether the multimedia content is stored in the first local cache 50 (2010). Since the first local cache 50 of the first MMS relay and the second local cache 60 of the second MMS relay 40 are synchronized to store the same multimedia content, the search result from the first local cache 50 is indicative of whether the multimedia content is stored in the second local cache 60.

If the first MMS relay 30 determines that the multimedia content is not stored in the first local cache 50 (2020), the first MMS relay 30 sends the multimedia content to the second MMS relay 40 (2030) and the first and second MMS relays 30 and 40 each store the multimedia content in their respective local caches 50 and 60 with an identical reference (2040). The second NMS relay 40 then follows the standard MMS procedure by sending a message notification to the second mobile 20 so that the second mobile device 20 can subsequently downloads the multimedia content from the second MMS relay 40 (2070).

On the other hand, if the first MMS relay 30 determines that the multimedia content is stored in the first local cache 50 (2020), the first MMS relay 30 sends a reference to the multimedia content, rather than the actual multimedia content, to the second MMS relay 40 (2050). After receiving the reference from the first MMS relay 30, the second MMS relay 40 retrieves the multimedia content in the second local cache 60 based on the reference (2060). The second MMS relay 40 then follows the standard MMS procedure by sending a message notification to the second mobile 20 so that the second mobile device 20 can subsequently download the multimedia content from the second MMS relay 40 (2070).

When the second embodiment of the present invention is utilized together with the first embodiment of the present invention, if the first MMS relay 30 determines that the multimedia content is not stored in the first local cache 50 based on the digest of the multimedia content received from the first mobile device 10, the first MMS relay 30 stores the multimedia content received from the first mobile device 10 in the first local cache 50 with a reference corresponding to the multimedia content and forwards the entire multimedia content to the second MMS relay 40 which stores the multimedia content in the second local cache 60 with the same reference. That is, as described previously, each MMS relay stores new multimedia content in the local cache upon receiving the new multimedia content, and at a later time, all MMS relays send the new multimedia content to each other for storage in their respective caches. Similarly, if the first MMS relay 30 determines that the multimedia content is stored in the first local cache 50 based on the digest of the multimedia content received from the first mobile device 10, the first MMS relay 30 transmits the reference of the multimedia content to the second MMS relay 40 which retrieves the multimedia content in the second local cache 60 based on the reference.

By utilizing synchronized caches for storing previously transmitted multimedia content at the MMS relays and transferring a reference of previously stored multimedia content, in accordance with the second embodiment of the present invention, redundant transfers are eliminated without the necessity of storing the multimedia content into the local caches upon publication.

While the present invention has been described in terms of a preferred embodiment, the scope of the invention is not limited thereto and is defined by the claims. The disclosed invention offers an effective and efficient system and method for sending MMS messages including multimedia content between mobile communication devices, wherein redundant transfers of multimedia content are eliminated.

What is claimed is:

1. A system for transferring multimedia content between mobile communication devices, the system comprising:
   a relay device configured to receive from a device a digest identifying multimedia content to be transferred; and
   a storage device communicably linked to the relay device and configured to store multimedia content previously transferred by the relay device,
   wherein the relay device is configured to:
      determine whether the multimedia content to be transferred is stored in the storage device based on the digest, and
      if the multimedia content to be transferred is not stored in the storage device, request and receive the multimedia content to be transferred from the device.

2. The system according to claim 1, wherein the device is a first mobile communication device, and the multimedia content to be transferred is multimedia content to be transferred from the first mobile communication device to a second mobile communication device.

3. The system according to claim 2, wherein the relay device is configured to store the multimedia content in the storage device after receiving the multimedia content from the first mobile communication device.

4. The system according to claim 2, wherein if the relay device determines that the multimedia content is stored in the storage device, the relay device is configured to retrieve the multimedia content from the storage device.

5. The system according to claim 2, wherein the digest includes a Cyclic Redundancy Check (CRC) identification stamp for the multimedia content to be transferred.

6. The system according to claim 2, wherein the multimedia content to be transferred is an image, and the digest includes a low-resolution JPEG image of the image.

7. The system according to claim 2, wherein the relay device comprises a Multimedia Messaging Service (MMS)-relay.

8. A system for transferring multimedia content between mobile communication devices, the system comprising:
   a first relay device;
   a first storage device communicably linked to the first relay device and configured to store multimedia content which was previously received by the first relay device;
   a second relay device communicably linked to the first relay device; and
   a second storage device communicably linked to the second relay device and configured to store multimedia content which was previously received by the second relay device, wherein the first and second storage devices are occasionally synchronized to store the same multimedia content with identical references, and the first relay device is configured to:
      determine whether multimedia content to be transferred is stored in the second storage device and,
      if the multimedia content to be transferred is stored in the second storage device, transmit to the second relay device a reference identifying the multimedia content to be transferred.

9. The system according to claim 8, wherein the first relay device is communicably linked to a first mobile communication device, and the multimedia content to be transferred is multimedia content to be transferred from the first mobile communication device to a second mobile communication device.

10. The system according to claim 9, wherein the second relay device is configured to retrieve from the second storage device the multimedia content to be transferred to the second mobile communication device based on the reference.

11. The system according to claim 9, wherein, if the first relay device determines the multimedia content to be transferred to the second mobile communication device is not stored in the second storage device, the first relay device is configured to transmit to the second relay device the multimedia content to be transferred to the second mobile communication device.

12. The system according to claim 11, wherein the first relay device and the second relay device are configured to store the multimedia content to be transferred to the second mobile communication device with identical references in the first storage device and the second storage device.

13. The system according to claim 11, wherein the first relay device and the second relay device are configured to store at a predetermined time the multimedia content to be transferred to the second mobile communication device with identical references in the first storage device and the second storage device.

14. The system according to claim 9, wherein the first storage device and the second storage device are periodically synchronized to store multimedia content which was previously received by at least one of the first and second relay devices.

15. The system according to claim 9, wherein the first storage device and second storage device are locally integrated with the first relay device and second relay device, respectively.

16. The system according to claim 9, wherein the first and second relay devices each comprises a Multimedia Messaging Service (MMS) relay.

17. A system for transferring multimedia content between mobile communication devices, the system comprising:
a first relay device configured to receive a digest identifying multimedia content to be transferred to a second mobile communication device from a first mobile communication device;
a first storage device communicably linked to the first relay device and configured to store multimedia content which was previously received by the first relay device;
a second relay device communicably linked to the first relay device; and
a second storage device communicably linked to the second relay device and configured to store multimedia content which was previously received by the second relay device, wherein the first and second storage devices are occasionally synchronized to store the same multimedia content with identical references, and the first relay device is configured to:
determine whether the multimedia content to be transferred to the second mobile communication device is stored in the second storage device based on the digest and,
if the multimedia content to be transferred to the second mobile communication device is stored in the second storage device, transmit to the second relay device a reference identifying the multimedia content to be transferred to the second mobile communication device.

18. The system according to claim 17, wherein the second relay device is configured to retrieve from the second storage device the multimedia content to be transferred to the second mobile communication device based on the reference.

19. The system according to claim 17, wherein, if the first relay device determines that the multimedia content to be transferred to the second mobile communication device is not stored in the second storage device, the first relay device is configured to:
request and receive from the first mobile communication device the multimedia content to be transferred to the second mobile communication device, and
transmit the multimedia content to be transferred to the second mobile communication device to the second relay device.

20. The system according to claim 19, wherein the first relay device and the second relay device are configured to store the multimedia content to be transferred to the second mobile communication device with identical references in the first storage device and the second storage device.

21. The system according to claim 19, wherein the first relay device and the second relay device are configured to store at a predetermined time the multimedia content to be transferred to the second mobile communication device with identical references in the first storage device and the second storage device.

22. The system according to claim 17, wherein the first storage device and the second storage device are periodically synchronized to store multimedia content which was previously received by at least one of the first and second relay devices.

23. The system according to claim 17, wherein the first storage device and second storage device are locally integrated with the first relay device and second relay device, respectively.

24. The system according to claim 17, wherein the first and second relay devices each comprises a Multimedia Messaging Service (MMS) relay.

25. The system according to claim 17, wherein the digest includes a Cyclic Redundancy Check (CRC) identification stamp for the multimedia content.

26. The system according to claim 17, wherein the multimedia content is an image, and the digest includes low-resolution JPEG image of the image.

27. A method for transferring multimedia content between mobile communication devices, the method comprising:
receiving from a device a digest identifying multimedia content to be transferred;
determining based on the digest whether the multimedia content to be transferred is stored in a storage device; and
requesting and receiving the multimedia content to be transferred from a device if it is determined that the multimedia content to be transferred is not stored in the storage device.

28. The method according to claim 27, wherein the device is a first mobile communication device, and the multimedia content to be transferred is multimedia content to be transferred to a second mobile communication device from the first mobile communication device.

29. The method according to claim 28, further comprising storing the multimedia content to be transferred in the storage device if the multimedia content to be transferred is received from the first mobile communication device.

30. The method according to claim 28, further comprising retrieving the multimedia content to be transferred from the storage device if it is determined that the multimedia content to be transferred is stored in the storage device.

31. The method according to claim 28, wherein the digest includes a Cyclic Redundancy Check (CRC) identification stamp for the multimedia content.

32. The method according to claim 28, wherein the multimedia content is an image digest includes a low-resolution JPEG image of the image.

33. The method according to claim 28, wherein the relay device comprises a Multimedia Messaging Service (MMS) relay.

34. A method for transferring multimedia content, the method comprising:
  determining at a first relay device whether multimedia content to be transferred is stored in a second storage device communicably linked to a second relay device;
  transmitting from the first relay device to the second relay device a reference identifying the multimedia content to be transferred if it is determined that the multimedia content to be transferred is stored in the second storage device; and
  transmitting from the first relay device to the second relay device the multimedia content to be transferred if it is determined that the multimedia content to be transferred is not stored in the second storage device.

35. The method according to claim 34, wherein the multimedia content to be transferred is multimedia content to be transferred to a second mobile communication device from a first mobile communication device.

36. The method according claim 35, further comprising retrieving from the second storage device the multimedia content to be transferred to the second mobile communication device based on the reference if the second relay device receives the reference from the first relay device.

37. The method according to claim 35, further comprising storing the multimedia content to be transferred to the second mobile communication device with an identical reference in the first storage device and the second storage device if it is determined that the multimedia content to be transferred to the second mobile communication device is not stored in the first storage device.

38. The method according to claim 35, further comprising storing the multimedia content to be transferred to the second mobile communication device with identical references in a first storage device and the second storage device if it is determined that the multimedia content to be transferred to the second mobile communication device is not stored in the second storage device, wherein the first storage device is communicably linked to the first relay device.

39. The method according to claim 35, further comprising periodically storing multimedia content which was previously received by at least one of the first and second relay devices in a first storage device and second storage device, wherein the first storage device is communicably linked to the first relay device.

40. The method according to claim 35, wherein the first storage device and second storage device are locally integrated with the first relay device and second relay device, respectively.

41. The method according to claim 35, wherein the first and second relay devices each comprises a Multimedia Messaging Service (MMS) relay.

42. A method for transferring multimedia content, the method comprising:
  receiving at a first relay device a digest from a first mobile communication device, the digest identifying multimedia content to be transferred to a second mobile communication device;
  determining whether the multimedia content to be transferred to the second mobile communication device is stored in a second storage device communicably linked to a second relay deve based on the digest; and
  transmitting from the first relay device to the second relay device a reference identifying the multimedia content to be transferred to the second mobile communication device if it is determined that the multimedia content to be transferred to the second mobile communication device is stored in the first storage device.

43. The method according to claim 42, further comprising receiving at the second relay device the reference from the first relay device and retrieving from the second storage device the multimedia content to be transferred to the second mobile communication device based on the reference.

44. The method according to claim 42, further comprising, if it is determined that the multimedia content to be transferred to the second mobile communication device is not stored in the second storage device, receiving from the first mobile communication device the multimedia content to be transferred to the second mobile communication device, and transmitting the multimedia content to be transferred to the second mobile communication device to the second relay device from the first relay device.

45. The method according to claim 44, further comprising storing the multimedia content to be transferred to the second mobile communication device with identical references in a first storage device and the second storage device if it is determined that the multimedia content to be transferred to the second mobile communication device is not stored in the second storage device, wherein the first storage device is communicably linked to the first relay device.

46. The method according to claim 44, further comprising storing at a predetermined time the multimedia content to be transferred to the second mobile communication device with identical references in a first storage device and the second storage device if it is determined that the multimedia content to be transferred to the second mobile communication device is not stored in the second storage device, wherein the first storage device is communicably linked to the first relay device.

47. The method according to claim 42, further comprising periodically storing multimedia content which was previously received by at least one of the first and second relay devices in a first storage device and the second storage device, wherein the first storage device is communicably linked to the first relay device.

48. The method according to claim 47, wherein the first storage device and second storage device are locally integrated with the first relay device and second relay device, respectively.

49. The method according to claim 42, wherein the first and second relay devices each comprises a Multimedia Messaging Service (MMS) relay.

50. The method according to claim 42, wherein the digest includes a Cyclic Redundancy Check (CRC) identification stamp for the multimedia content.

51. The method according to claim 42, wherein the multimedia content is an image digest includes low-resolution JPEG image of the image.

52. A relay device of a communication system for transferring multimedia content, the relay device comprising:
a storage device configured to store multimedia content, wherein the relay device is configured to:
received from a device a digest identifying multimedia content to be transferred by the relay, determine whether the multimedia content to be transferred is stored in the storage device based on the digest, and
if the multimedia content to be transferred is not stored in the storage device, request and receive the multimedia content to be transferred from the device.

53. The relay device according to claim 52, wherein the relay device is configured to store the multimedia content to be transferred in the storage device together with a reference identifying the multimedia content to be transferred.

54. The relay device according to claim 52, wherein the relay device is configured to transfer a reference identifying the multimedia content to be transferred if the relay device determines the multimedia content to be transferred is stored in the storage device.

55. The relay device according to claim 52, wherein the relay device is configured to receive and store in the storage device multimedia content which was received by other relay devices in the communication system.

56. The relay device according to claim 52, wherein the relay device periodically transmits to other relay devices of the communication system multimedia content which received the relay device during a previous predetermined time period.

57. The relay device according to claim 52, wherein the digest includes a Cyclic Redundancy Check (CRC) identification stamp for the multimedia content or a low-resolution JPEG image of the multimedia content.

58. The relay device according to claim 52, wherein the relay device comprises a Multimedia Messaging Service (MMS) relay.

* * * * *